United States Patent
Lee et al.

(10) Patent No.: US 11,551,672 B2
(45) Date of Patent: Jan. 10, 2023

(54) METHOD FOR GENERATING ACOUSTIC MODEL

(71) Applicant: LG ELECTRONICS INC., Seoul (KR)

(72) Inventors: Jeehye Lee, Seoul (KR); Seonyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 17/061,166

(22) Filed: Oct. 1, 2020

(65) Prior Publication Data

US 2021/0183375 A1    Jun. 17, 2021

(51) Int. Cl.
  *G10L 15/16*  (2006.01)
  *G10L 15/06*  (2013.01)
  *G10L 15/02*  (2006.01)
  *G10L 15/07*  (2013.01)

(52) U.S. Cl.
  CPC .............. *G10L 15/16* (2013.01); *G10L 15/02* (2013.01); *G10L 15/063* (2013.01); *G10L 15/07* (2013.01); *G10L 2015/025* (2013.01); *G10L 2015/0635* (2013.01)

(58) Field of Classification Search
  CPC ....... G10L 15/16; G10L 15/02; G10L 15/063; G10L 15/07; G10L 2015/025; G10L 2015/0635
  See application file for complete search history.

(56) References Cited

U.S. PATENT DOCUMENTS

| | | | |
|---|---|---|---|
| 8,583,432 B1 * | 11/2013 | Biadsy .................. | G10L 15/063 704/235 |
| 9,495,955 B1 * | 11/2016 | Weber ................... | G10L 15/063 |
| 9,507,852 B2 * | 11/2016 | Petrov ................... | G06F 40/289 |
| 9,589,564 B2 * | 3/2017 | Sharifi .................. | G10L 15/005 |
| 10,839,788 B2 * | 11/2020 | Feinauer ............... | G10L 15/005 |
| 11,282,501 B2 * | 3/2022 | Yoo ......................... | G10L 25/30 |
| 2018/0190269 A1 * | 7/2018 | Lokeswarappa ....... | G09B 19/06 |

OTHER PUBLICATIONS

Marco et al., "Using a Hybrid Approach for Entity Recognition in the Biomedical Domain," 7th International Symposium on Semantic Mining in Biomedicine, Potsdam, Germany, Aug. 4, 2016-Aug. 5, 2016 (Year: 2016).*

* cited by examiner

*Primary Examiner* — Michelle M Koeth
(74) *Attorney, Agent, or Firm* — Lee, Hong, Degerman, Kang & Waimey PC

(57) ABSTRACT

A method for generating an acoustic model is disclosed. The method can generate the acoustic model with high accuracy through learning data including various dialects by training the acoustic model using text data, to which regional information is tagged, and changing a parameter of the acoustic model based on the tagged regional information. The acoustic model can be associated with an artificial intelligence module, an unmanned aerial vehicle (UAV), a robot, an augmented reality (AR) device, a virtual reality (VR) device, devices related to 5G services, and the like.

12 Claims, 15 Drawing Sheets

METHOD FOR GENERATING ACOUSTIC MODEL

CROSS-REFERENCE TO RELATED APPLICATION(S)

Pursuant to 35 U.S.C. § 119(a), this application claims the benefit of earlier filing date and right of priority to Korean Patent Application No. 10-2019-0165531, filed on Dec. 12, 2019, the contents of which are hereby incorporated by reference herein in its entirety.

TECHNICAL FIELD

The present disclosure relates to a method and a device for generating an acoustic model.

BACKGROUND

Machine learning (e.g., deep learning) is an algorithm technique that it itself may classify and learn the features of input data.

The component technology is a technique for mimicking the human brain's perception and decision capabilities using a machine learning algorithm, and this may be divided into several technical fields, such as linguistic understanding, visual understanding, inference/prediction, knowledge expression, and operation control.

In order to derive proper learning efficiency from a text complexly including various dialects and/or a text including imitation dialects in training of an acoustic model adapted to dialects, parameters (e.g. weights) of the acoustic model need to be adjusted.

SUMMARY

An object of the present disclosure is to address the above-described and other needs and/or problems.

Another object of the present disclosure is to implement a method for generating an acoustic model capable of determining main regional information of training data from voice data used in training.

Another object of the present disclosure is to implement a method for generating an acoustic model capable of transferring voice data used in training to text data and giving different weights according to regional information when weights are given to the transferred text data.

Another object of the present disclosure is to implement a method for generating an acoustic model capable of processing all various dialects using one acoustic model.

Another object of the present disclosure is to implement a method for generating an acoustic model capable of preventing a reduction in accuracy of the acoustic model due to utterances imitating dialects of other regions.

Another object of the present disclosure is to implement a method for generating an acoustic model capable of adapting and training only a main dialect determined as a representative region without side effects of other dialects when various dialects are mixed in one utterance.

In one aspect of the present disclosure, there is provided a method for generating an acoustic model, the method comprising receiving voice data for training the acoustic model; generating text data corresponding to the voice data; determining a representative region of the received voice data; tagging regional information to a plurality of words included in the generated text data; and training the acoustic model using the text data, to which the regional information is tagged, and changing a parameter of the acoustic model based on the representative region determined from the voice data and the tagged regional information.

Receiving the voice data may comprise receiving the voice data using regionally different dialects that are acquired via voice input/output interfaces of various electronic devices.

Tagging the regional information may comprise tagging the regional information to the plurality of words using a language dictionary.

Tagging the regional information may comprise applying a parameter indicating the representative region and a feature extracted from the text data to a tagging model based on a pre-trained artificial neural network to generate an output for tagging the regional information to the text data; and tagging the regional information to the plurality of words based on the output.

The tagging model may be a model based on one of a conditional random field (CRF), a recurrent neural network (RNN), or a long-short term memory (LSTM).

The feature extracted from the text data may include at least one of context information, part of speech (POS) information, or morpheme information.

Changing the parameter of the acoustic model comprises giving a higher weight to a word, to which the regional information corresponding to the representative region is tagged, than a word to which other regional information is tagged.

Determining the representative region may comprise extracting an utterance feature from the voice data; applying the extracted utterance feature to a region classifier based on a pre-trained artificial neural network to generate an output for determining the representative region of the voice data; and determining, as the representative region, a region corresponding to a highest value of output values corresponding to a plurality of regions based on the output.

The utterance feature may be a feature vector of at least one of a linear frequency cepstral coefficient (LFCC), a Mel frequency cepstral coefficient (MFCC), or i-vector.

The artificial neural network may be one of a dynamic recurrent neural network (DRNN) or a convolutional recurrent neural network (CRNN).

The method may further comprise, when a word, to which the regional information is not tagged, exists in the plurality of words as a result of tagging the regional information to the plurality of words using the language dictionary, tagging the regional information to the plurality of words using the tagging model based on the pre-trained artificial neural network.

The method may further comprise tagging the regional information to the plurality of words using the tagging model based on the pre-trained artificial neural network; comparing a first tagging result using the language dictionary with a second tagging result using the tagging model; and if the first tagging result and the second tagging result are different from each other, updating the tagging of the text data based on the second tagging result in response to this.

In another aspect, there is provided a computing device comprising a transceiver configured to receive voice data for training an acoustic model; and a processor configured to generate text data corresponding to the voice data, determine a representative region of the received voice data, tag regional information to a plurality of words included in the generated text data, and change a parameter of the acoustic model based on the regional information tagged to the plurality of words.

Effects of a method for generating an acoustic model according to embodiments of the present disclosure are described as follows.

The present disclosure can determine main regional information of training data from voice data used in training.

The present disclosure can transfer voice data used in training to text data and give different weights according to regional information when weights are given to the transferred text data.

The present disclosure can process all various dialects using one acoustic model.

The present disclosure can prevent a reduction in accuracy of an acoustic model due to utterances imitating dialects of other regions.

The present disclosure can adapt and train only a main dialect determined as a representative region without side effects of other dialects when various dialects are mixed in one utterance.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
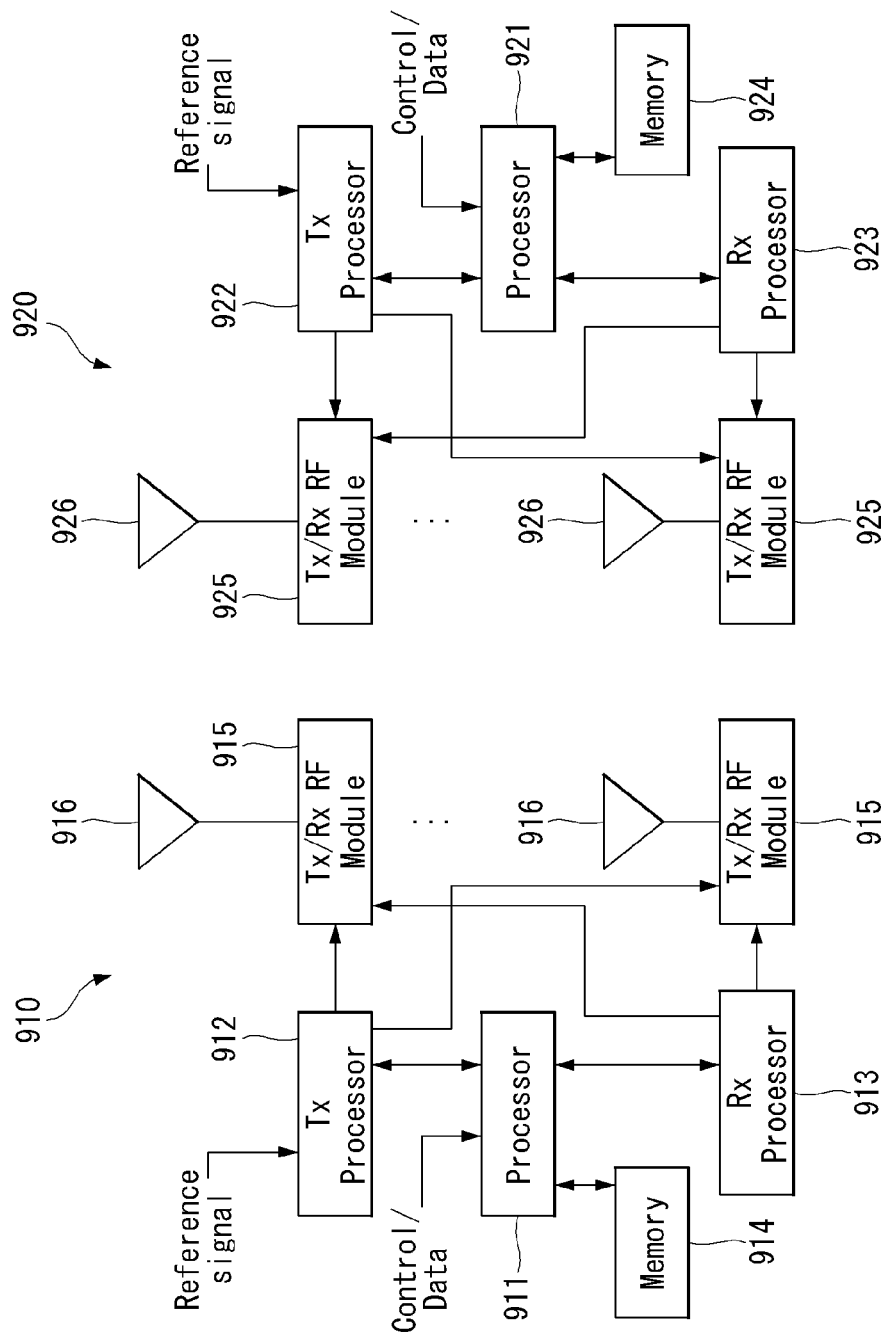
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
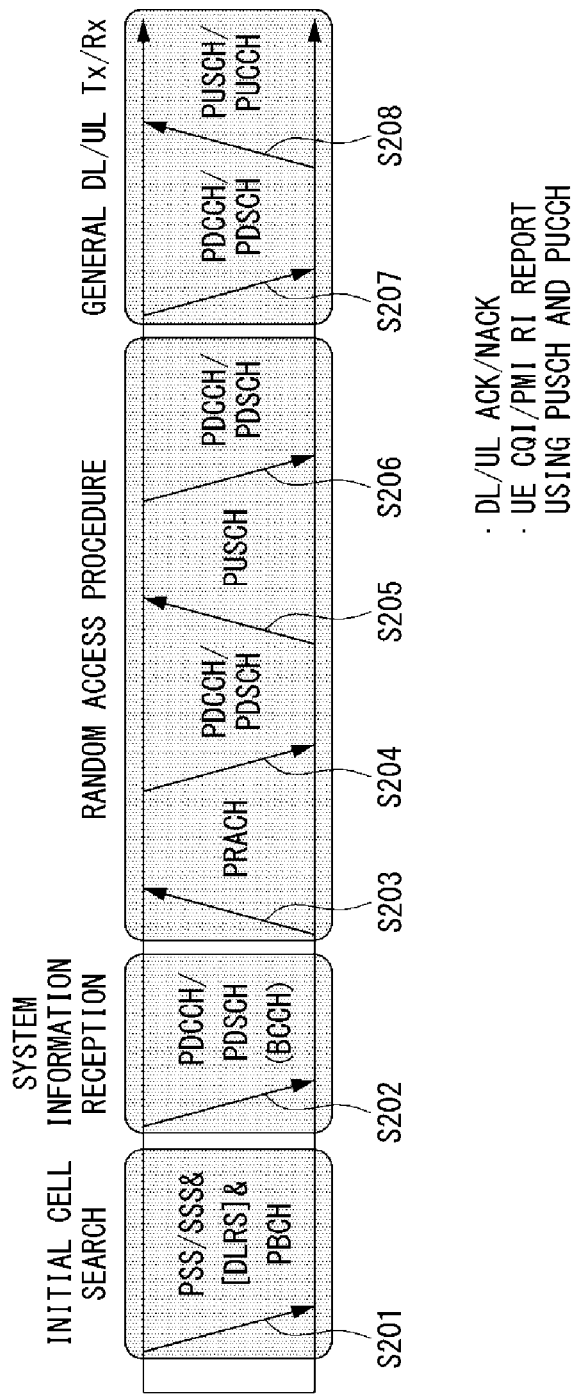
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set.

CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between User Equipments Using 5G Communication

Figure 3:
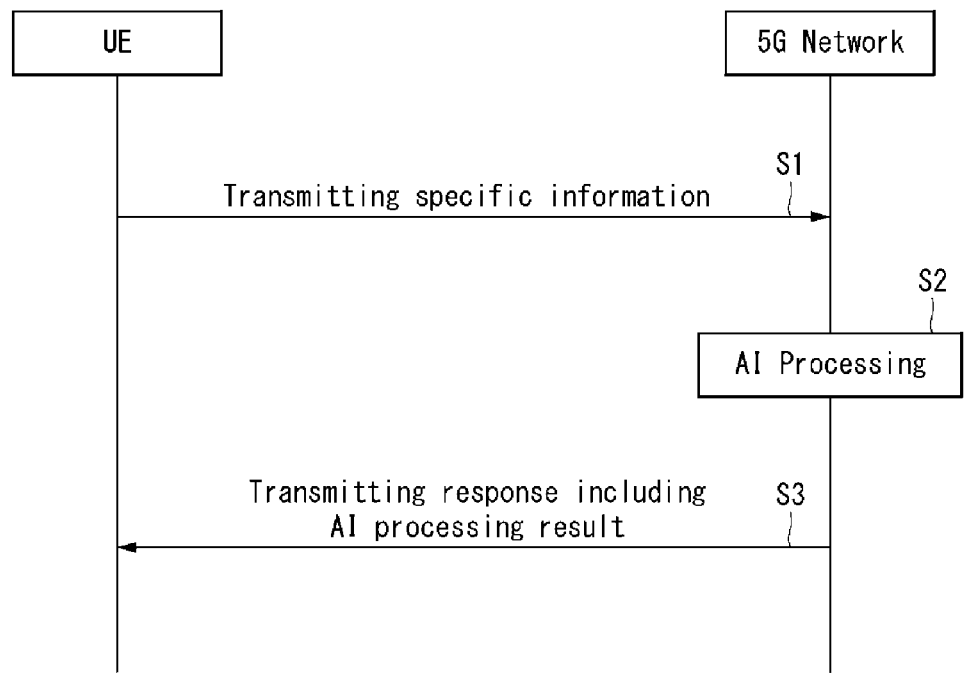
FIG. 3 shows an example of basic operations of an autonomous vehicle and a 5G network in a 5G communication system.

FIG. 3 shows an example of basic operations of a user equipment and a 5G network in a 5G communication system.

The user equipment transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the user equipment (S3).

G. Applied Operations Between User Equipment and 5G Network in 5G Communication System Hereinafter, the operation of a user equipment using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the user equipment performs an initial access procedure and a random access procedure with the 5G network prior to step S1 of FIG. 3 in order to transmit/receive signals, information and the like to/from the 5G network.

More specifically, the user equipment performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the user equipment receives a signal from the 5G network.

In addition, the user equipment performs a random access procedure with the 5G network for UL synchronization acquisition and/or UL transmission. The 5G network can transmit, to the user equipment, a UL grant for scheduling transmission of specific information. Accordingly, the user equipment transmits the specific information to the 5G network on the basis of the UL grant. In addition, the 5G network transmits, to the user equipment, a DL grant for scheduling transmission of 5G processing results with respect to the specific information. Accordingly, the 5G network can transmit, to the user equipment, information (or a signal) related to remote control on the basis of the DL grant.

Next, a basic procedure of an applied operation to which a method proposed by the present invention which will be described later and URLLC of 5G communication are applied will be described.

As described above, a user equipment can receive DownlinkPreemption IE from the 5G network after the user equipment performs an initial access procedure and/or a random access procedure with the 5G network. Then, the user equipment receives DCI format 2_1 including a preemption indication from the 5G network on the basis of DownlinkPreemption IE. The user equipment does not perform (or expect or assume) reception of eMBB data in resources (PRBs and/or OFDM symbols) indicated by the preemption indication. Thereafter, when the user equipment needs to transmit specific information, the user equipment can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the user equipment receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the user equipment transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
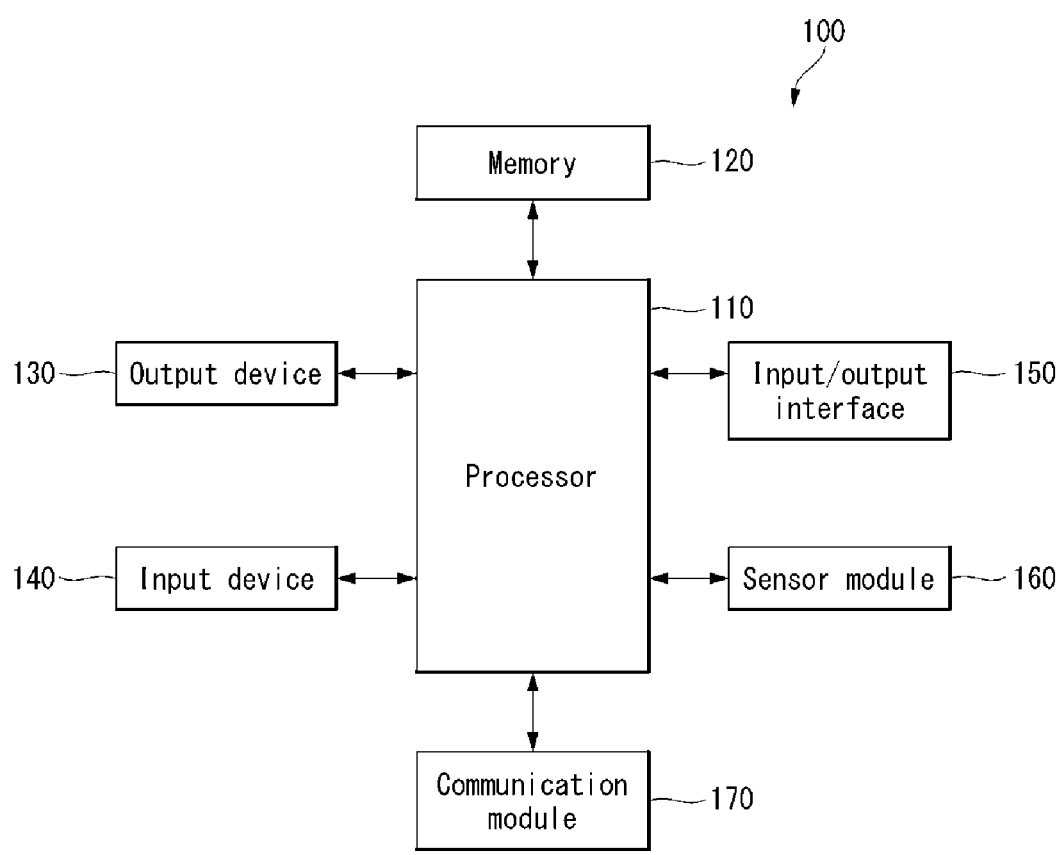
FIG. 4 illustrates a block diagram of an electronic device.

FIG. 4 illustrates a block diagram of an electronic device.

Referring to FIG. 4, an electronic device 100 may include at least one processor 110, a memory 120, an output device 130, an input device 140, an input/output interface 150, a sensor module 160, and a communication module 170.

The processor 110 may include at least one application processor (AP), at least one communication processor (CP), or at least one artificial intelligence (AI) processor. The application processor, the communication processor, or the AI processor may be respectively included in different integrated circuit (IC) packages, or may be included in one IC package.

The application processor may control a plurality of hardware or software components connected to the application processor by running an operating system or an application program, and perform various data processing/operation including multimedia data. For example, the application processor may be implemented as a system on chip (SoC). The processor 110 may further include a graphic processing unit (GPU) (not shown).

The communication processor may perform functions of managing a data link and converting a communication protocol in communication between the electronic device 100 and other electronic devices connected via a network. For example, the communication processor may be implemented as the SoC. The communication processor may perform at least a portion of a multimedia control function.

In addition, the communication processor may control data transmission and reception of the communication module 170. The communication processor may be implemented to be included as at least a part of the application processor.

The application processor or the communication processor may load, on a volatile memory, and process a command or data that is received from at least one of a non-volatile memory or other components connected to each of the application processor and the communication processor. Further, the application processor or the communication processor may store data, that is received from at least one of other components or generated by at least one of the other components, in the non-volatile memory.

The memory 120 may include an internal memory or an external memory. The internal memory may include at least one of a volatile memory (e.g., dynamic RAM (DRAM), static RAM (SRAM), synchronous dynamic RAM (SDRAM), etc.) or a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.). According to an embodiment, the internal memory may take the form of a solid state drive (SSD). The external memory may include flash drive, for example, compact flash (CF), secure digital (SD), micro secure digital (Micro-SD), mini secure digital (Mini-SD), extreme digital (xD) or a memory stick, etc.

The output device 130 may include at least one of a display module or a speaker. The output device 130 may display various types of data including multimedia data, text data, voice data, etc. to a user or output the data as sound.

The input device 140 may include a touch panel, a digital pen sensor, a key, or an ultrasonic input device, etc. For example, the input device 140 may be the input/output interface 150. The touch panel may recognize a touch input in at least one of capacitive, pressure-sensitive, infrared, or ultrasonic types. In addition, the touch panel may further include a controller (not shown). In case of a capacitive touch panel, not only direct touch but also proximity recognition is possible. The touch panel may further include a tactile layer. In this case, the touch panel may provide a tactile reaction to the user.

The digital pen sensor may be implemented using the same or similar method to receiving a user's touch input or a separate recognition layer. The key may use a keypad or a touch key. The ultrasonic input device is a device that can confirm data by detecting a micro-sonic wave at a user equipment (UE) through a pen generating an ultrasonic signal, and is capable of wireless recognition. The electronic device 100 may also receive a user input from an external device (e.g., network, computer, or server) connected to the communication module 170 using the communication module 170.

The input device 140 may further include a camera module and a microphone. The camera module is a device capable of taking images and videos, and may include one or more image sensors, an image signal processor (ISP), or a flash LED. The microphone may receive a voice signal and convert it into an electrical signal.

The input/output interface 150 may transmit a command or data, that is input from the user through the input device or the output device, to the processor 110, the memory 120, the communication module 170, etc. through a bus (not shown). For example, the input/output interface 150 may provide the processor 110 with data for a user's touch input that is input through the touch panel. For example, the input/output interface 150 may output a command or data, that is received from the processor 110, the memory 120, the communication module 170, etc. through the bus, through the output device 130. For example, the input/output interface 150 may output voice data processed by the processor 110 to the user through the speaker.

The sensor module 160 may include at least one of a gesture sensor, a gyro sensor, an atmospheric pressure sensor, a magnetic sensor, an acceleration sensor, a grip sensor, a proximity sensor, an RGB (red, green, blue) sensor, a biometric sensor, a temperature/humidity sensor, an illuminance sensor, or an ultraviolet (UV) sensor. The sensor module 160 may measure physical quantity or sense an operating state of the electronic device 100 to convert measured or sensed information into electrical signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, a fingerprint sensor, or the like. The sensor module 160 may further include a control circuit for controlling at least one sensor included therein.

The communication module 170 may include a wireless communication module or an RF module. The wireless communication module may include, for example, Wi-Fi, BT, GPS or NFC. For example, the wireless communication module may provide a wireless communication function using a radio frequency. Additionally or alternatively, the wireless communication module may include a network interface or a modem, etc. for connecting the electronic device 100 to a network (e.g., Internet, LAN, WAN, telecommunication network, cellular network, satellite network, POTS or 5G network, etc.).

The RF module may be responsible for transmitting and receiving data, for example, transmitting and receiving an RF signal or a called electronic signal. For example, the RF module may include a transceiver, a power amp module (PAM), a frequency filter, or a low noise amplifier (LNA), etc. Further, the RF module may further include components, for example, conductors or lead wires, etc. for transmitting and receiving electromagnetic waves in a free space in wireless communication.

The electronic device 100 according to various embodiments of the present disclosure may include at least one of a server, a TV, a refrigerator, an oven, a clothing styler, a robot cleaner, a drone, an air conditioner, an air cleaner, a PC, a speaker, a home CCTV, an electric light, a washing machine, and a smart plug. Since the components of the electronic device 100 illustrated in FIG. 4 are exemplified as components generally provided in an electronic device, the electronic device 100 according to the embodiment of the present disclosure is not limited to the above-described components, and the components may be omitted and/or added, if necessary or desired.

Figure 5:
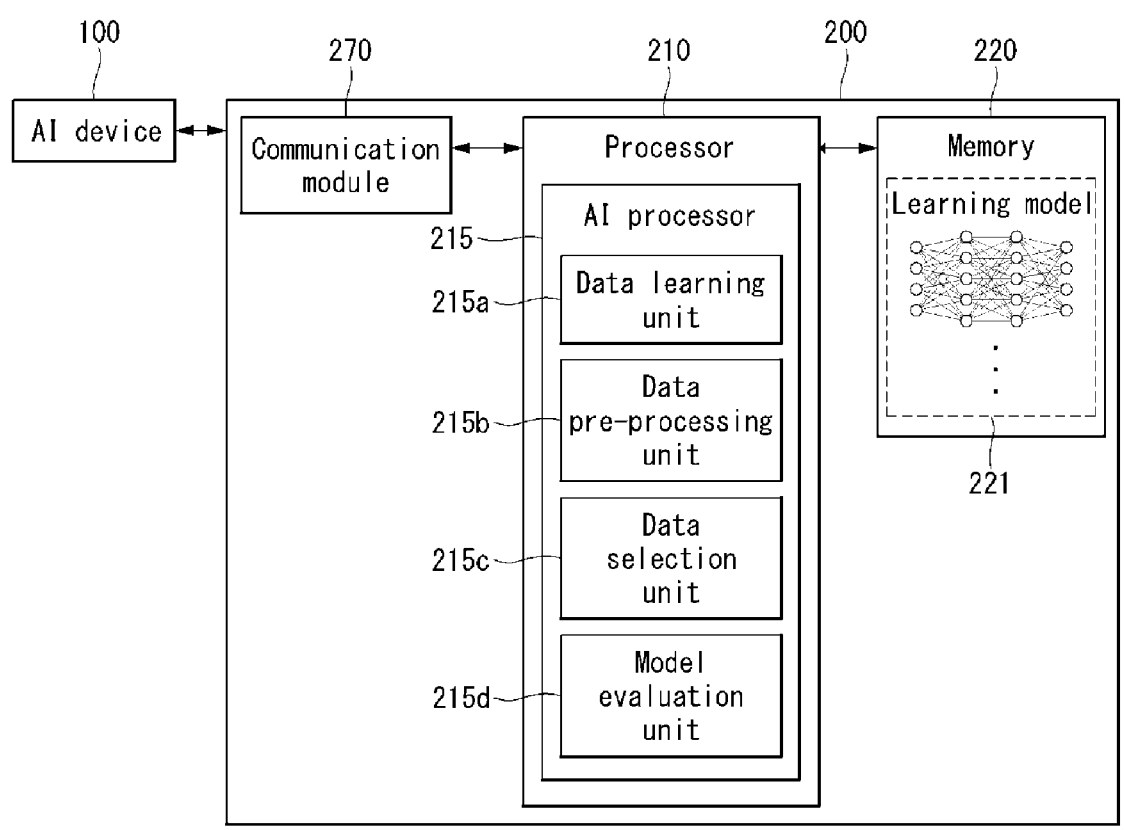
FIG. 5 illustrates a schematic block diagram of an AI server according to an embodiment of the present disclosure.

The electronic device 100 may perform an artificial intelligence-based control operation by receiving a result of AI processing from a cloud environment illustrated in FIG. 5, or may perform AI processing in an on-device manner by including an AI module in which components related to an AI process are integrated into one module.

An AI process performed in a device environment and/or a cloud environment or a server environment is described below with reference to FIGS. 5 and 6. FIG. 5 illustrates an example in which receiving data or signals may be performed in the electronic device 100, but AI processing for processing the input data or signals is performed in the cloud environment. In contrast, FIG. 6 illustrates an example of on-device processing in which the overall operation of AI processing for input data or signals is performed in the electronic device 100.

Figure 6:
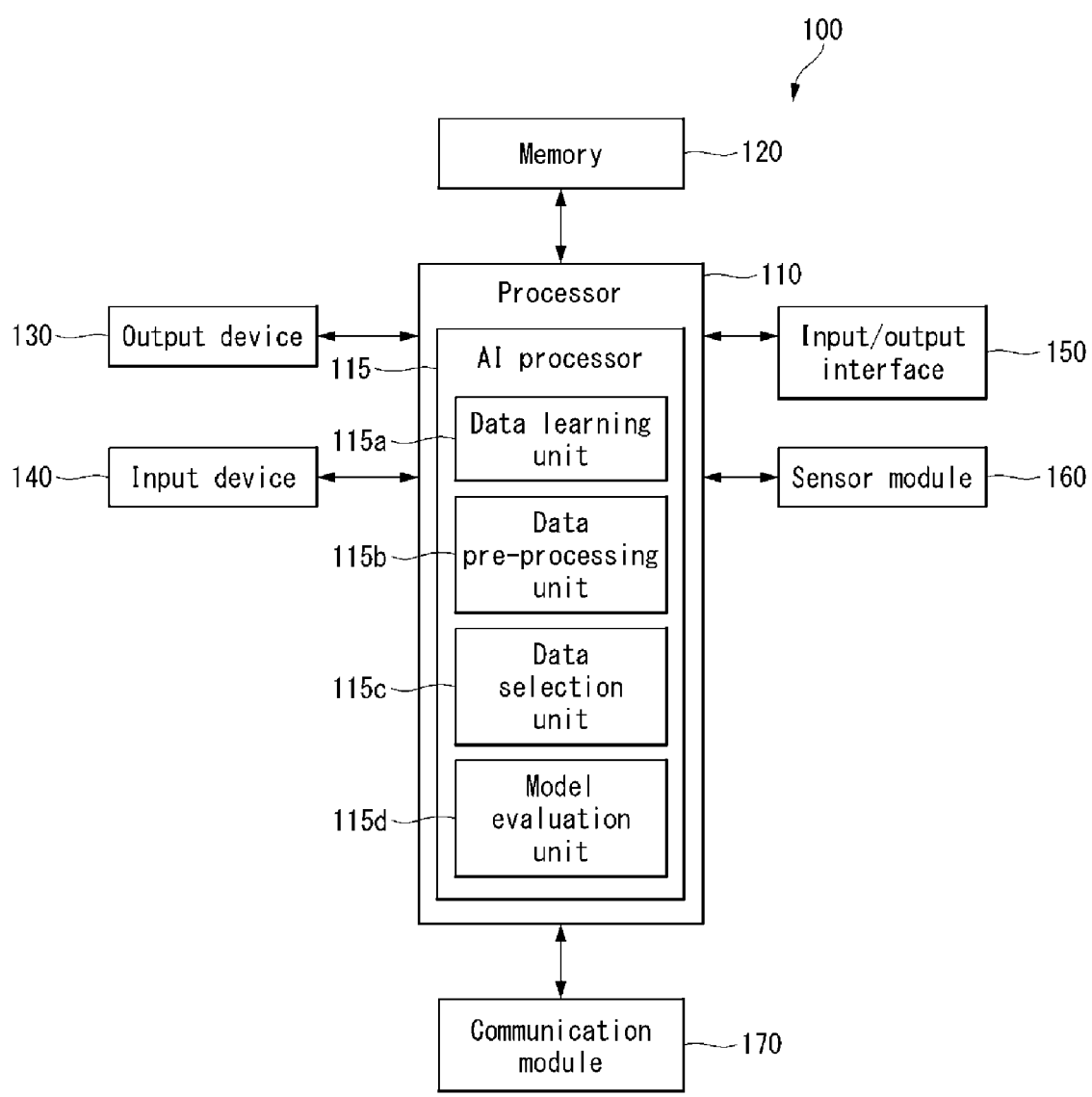
FIG. 6 illustrates a schematic block diagram of an AI device according to another embodiment of the present disclosure.

In FIGS. 5 and 6, the device environment may be referred to as a 'client device' or an 'AI device', and the cloud environment may be referred to as a 'server'.

FIG. 5 illustrates a schematic block diagram of an AI server according to an embodiment of the present disclosure.

A server 200 may include a processor 210, a memory 220, and a communication module 270.

An AI processor 215 may learn a neural network using a program stored in the memory 220. In particular, the AI processor 215 may learn the neural network for recognizing data related to an operation of an AI device 100. Here, the neural network may be designed to simulate the human brain structure (e.g., the neuronal structure of the human neural network) on a computer. The neural network may include an input layer, an output layer, and at least one hidden layer. Each layer may include at least one neuron with a weight, and the neural network may include a synapse connecting neurons and neurons. In the neural network, each neuron may output an input signal input through the synapse as a function value of an activation function for weight and/or bias.

A plurality of network modes may exchange data according to each connection relationship so that neurons simulate synaptic activity of neurons that exchange signals through the synapses. Here, the neural network may include a deep learning model developed from a neural network model. In the deep learning model, a plurality of network nodes are located on different layers and may exchange data according to a convolution connection relationship. Examples of the neural network model may include various deep learning techniques such as a deep neural network (DNN), a convolutional neural network (CNN), a recurrent neural network, a restricted Boltzmann machine, a deep belief network, and a deep Q-Network, and may be applied in fields such as vision recognition, voice recognition, natural language processing, and voice/signal processing.

The processor 210 performing the functions described above may be a general-purpose processor (e.g., a CPU), but may be a dedicated AI processor (e.g., a GPU) for AI learning.

The memory 220 may store various programs and data necessary for the operation of the AI device 100 and/or the server 200. The memory 220 may be accessed by the AI processor 215, and may read/write/modify/delete/update data by the AI processor 215. In addition, the memory 220 may store a neural network model (e.g., the deep learning model) generated through a learning algorithm for data classification/recognition according to an embodiment of the present disclosure. Furthermore, the memory 220 may store not only a learning model 221 but also input data, training data, and learning history, etc.

The AI processor 215 may include a data learning unit 215a for learning a neural network for data classification/recognition. The data learning unit 215a may learn criteria regarding what training data to use to determine data classification/recognition, and how to classify and recognize the data using the training data. The data learning unit 215a may learn the deep learning model by acquiring training data to be used for learning and applying the acquired training data to the deep learning model.

The data learning unit 215a may be manufactured in a form of at least one hardware chip and may be mounted on the server 200. For example, the data learning unit 215a may be manufactured in a form of a dedicated hardware chip for artificial intelligence, or may be manufactured as part of a general-purpose processor (CPU) or a dedicated graphics processor (GPU) and mounted on the server 200. In addition, the data learning unit 215a may be implemented as a software module. When the data learning unit 215a is implemented as the software module (or a program module including instructions), the software module may be stored in a non-transitory computer readable media. In this case, at least one software module may be provided to an operating system (OS), or may be provided by an application.

The data learning unit 215a may learn the neural network model to have criteria for determining how to classify/recognize preset data using the acquired training data. In this instance, a learning method by a model learning unit may be classified into supervised learning, unsupervised learning, and reinforcement learning. Here, the supervised learning may refer to a method of learning an artificial neural network in a state where a label for training data is given, and the label may mean a correct answer (or a result value) that the artificial neural network has to infer when the training data is input to the artificial neural network. The unsupervised learning may mean a method of learning an artificial neural network in a state where the label for training data is not given. The reinforcement learning may mean a method in which an agent defined in a specific environment is learned to select an action or a sequence of actions that maximize cumulative rewards in each state. Further, the model learning unit may learn the neural network model using a learning algorithm including an error backpropagation method or a gradient decent method. When the neural network model is learned, the learned neural network model may be referred to as the learning model 221. The learning model 221 is stored in the memory 220 and may be used to infer a result for new input data rather than the training data.

The AI processor 215 may further include a data pre-processing unit 215b and/or a data selection unit 215c, in order to improve analysis results using the learning model 221 or to save resources or time required to generate the learning model 221.

The data pre-processing unit 215b may pre-process the acquired data so that the acquired data can be used for learning/inference for determining a situation. For example, the data pre-processing unit 215b may extract feature information as pre-processing for input data acquired through the input device, and the feature information may be extracted in a format such as a feature vector, a feature point, or a feature map.

The data selection unit 215c may select data necessary for learning among training data or training data pre-processed by the pre-processing unit. The selected training data may be provided to the model learn unit. For example, the data selection unit 215c may select only data for an object included in a specific region as training data by detecting the specific region among images acquired through a camera of the electronic device. Further, the selection unit 215c may select data necessary for inference among input data acquired through the input device or input data pre-processed by the pre-processing unit.

The AI processor 215 may further include a model evaluation unit 215d to improve the analysis results of the neural network model. The model evaluation unit 215d may input evaluation data into the neural network model and may allow the model learning unit to learn again when an analysis result output from the evaluation data does not satisfy a predetermined criterion. In this case, the evaluation data may be preset data for evaluating the learning model 221. For example, among the analysis results of the learned neural network model for the evaluation data, when the number or ratio of evaluation data whose analysis results are not accurate exceeds a preset threshold, the model evaluation unit 215d may evaluate that a predetermined criterion are not satisfied.

The communication module 270 may send a result of AI processing by the AI processor 215 to an external electronic device.

As described above, FIG. 5 illustrates that the AI process is implemented in the cloud environment due to computing operation, storage, and power constraints, by way of example, but the present disclosure is not limited thereto. For example, the AI processor 215 may be implemented by being included in a client device. FIG. 6 is an example in which AI processing is implemented in the client device, and is substantially the same as that illustrated in FIG. 5 except that the AI processor 215 is included in the client device.

FIG. 6 illustrates a schematic block diagram of an AI device according to another embodiment of the present disclosure.

The function of each configuration illustrated in FIG. 6 may refer to FIG. 5. However, since the AI processor is included in a client device 100, it may not be necessary to communicate with the server 200 (see FIG. 5) in performing a process such as data classification/recognition, etc., and hence an immediate or real-time data classification/recognition operation is possible. Further, since it is not necessary to send personal information of the user to the server 200 (see FIG. 5), it is possible to classify/recognize data for the purpose without leaking the personal information.

The respective components illustrated in FIGS. 5 and 6 indicate functional elements that are divided functionally, and it is noted that at least one component can be implemented in a form (e.g., AI module) integrated with each other in a real physical environment. It goes without saying that components that are not disclosed may be included or omitted, in addition to the plurality of components illustrated in FIGS. 5 and 6.

Figure 7:
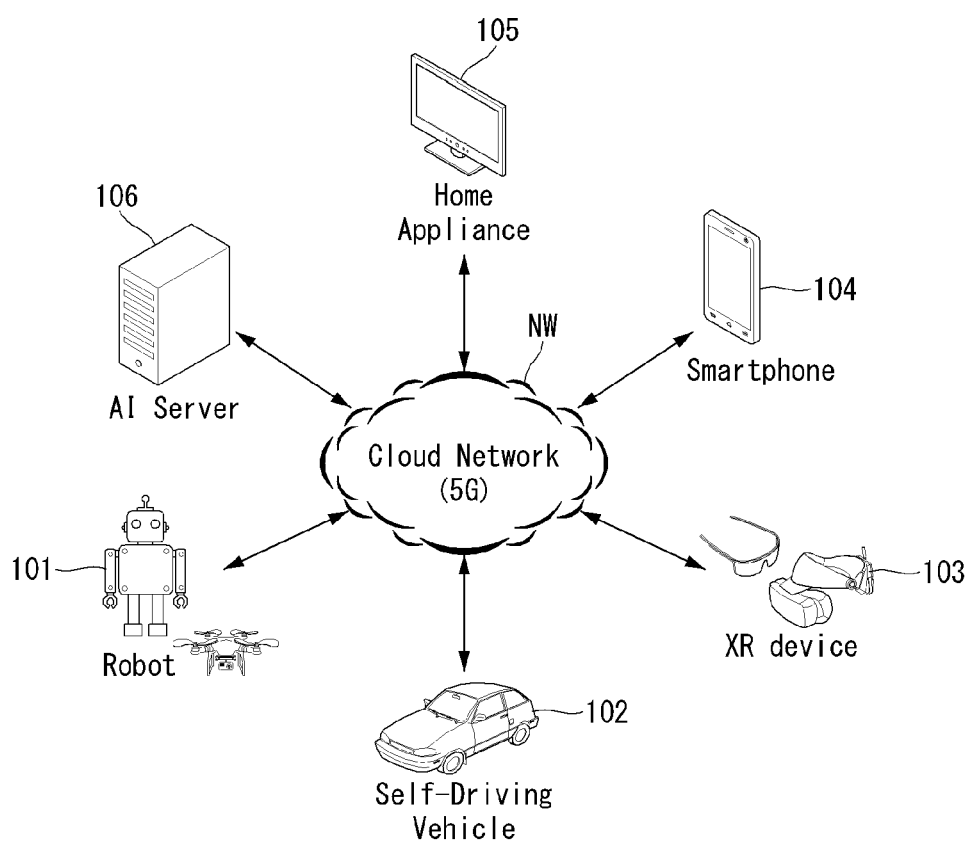
FIG. 7 is a conceptual diagram of an AI device according to an embodiment of the present disclosure.

FIG. 7 is a conceptual diagram of an AI device according to an embodiment of the present disclosure.

Referring to FIG. 7, in an AI system 1, at least one of an AI server 106, a robot 101, an autonomous vehicle 102, an XR device 103, a smartphone 104, or a home appliance 105 is connected to a cloud network NW. The robot 101, the autonomous vehicle 102, the XR device 103, the smartphone 104, or the home appliance 105 applied with the AI technology may be referred to as the AI devices 101 to 105.

The cloud network NW may mean a network that forms a part of a cloud computing infrastructure or exists in the cloud computing infrastructure. The cloud network NW may be configured using the 3G network, the 4G or Long Term Evolution (LTE) network, or the 5G network.

That is, the respective devices 101 to 106 constituting the AI system 1 may be connected to each other via the cloud network NW. In particular, the respective devices 101 to 106 may communicate with each other through a base station, but may directly communicate with each other without going through the base station.

The AI server 106 may include a server performing AI processing and a server performing operations on big data.

The AI server 106 may be connected to at least one of the robot 101, the autonomous vehicle 102, the XR device 103, the smartphone 104, or the home appliance 105, which are AI devices constituting the AI system, via the cloud network NW, and may assist at least a part of the AI processing of the connected AI devices 101 to 105.

In this instance, the AI server 106 may learn the artificial neural network according to a machine learning algorithm instead of the AI devices 101 to 105, and directly store the learning model or send it to the AI devices 101 to 105.

In this instance, the AI server 106 may receive input data from the AI devices 101 to 105, infer a result value for the received input data using the learning model, generate a response or a control command based on the inferred result value, and transmit it to the AI devices 101 to 105.

Alternatively, the AI devices 101 to 105 may infer the result value for the input data directly using the learning model and generate a response or a control command based on the inferred result value.

Figure 8:
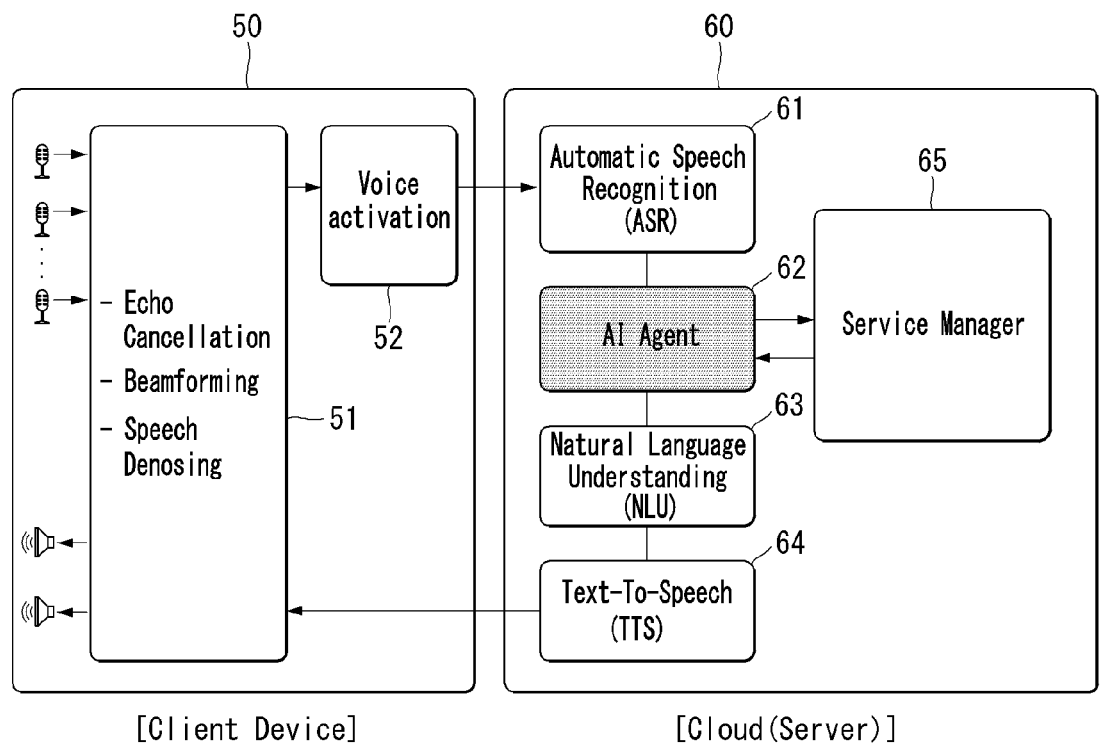
FIG. 8 is an example block diagram of a voice processing device according to an embodiment of the present disclosure.

A speech processing performed in the device environment and/or the cloud environment or the server environment is described below with reference to FIGS. 8 and 9. FIG. 8 illustrates an example in which the input of speech may be performed in the device 50, but the process of synthesizing the speech by processing the input speech, that is, the overall operation of the speech processing is performed in the cloud environment 60. On the other hand, FIG. 9 illustrates an example of on-device processing in which the overall operation of the speech processing to synthesize the speech by processing the input speech described above is performed in the device 70.

Figure 9:
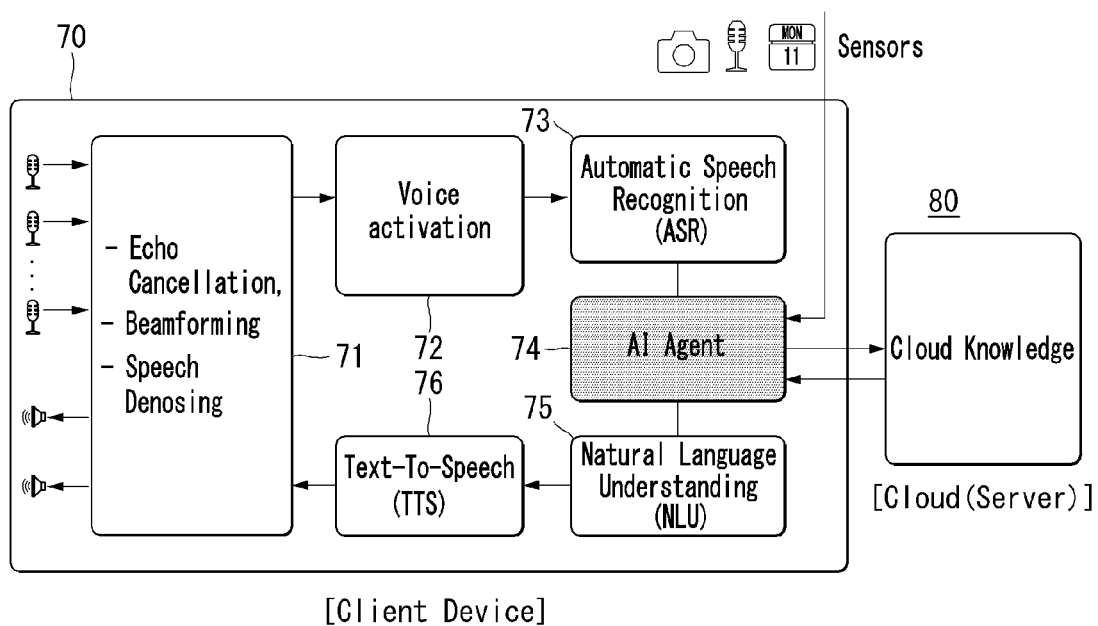
FIG. 9 is an example block diagram of a voice processing device according to another embodiment of the present disclosure.

In FIGS. 8 and 9, the device environments 50 and 70 may be referred to as a client device, and the cloud environments 60 and 80 may be referred to as a server.

FIG. 8 is an example block diagram of a voice processing device in a voice processing system according to an embodiment of the present disclosure.

In an end-to-end speech UI environment, various components are required to process speech events. The sequence for processing the speech event performs speech signal acquisition and playback, speech pre-processing, voice activation, speech recognition, natural language processing, and finally a speech synthesis process in which the device responds to the user.

A client device 50 may include an input module. The input module may receive a user input from a user. For example, the input module may receive the user input from a connected external device (e.g., keyboard, headset). For example, the input module may include a touch screen. For example, the input module may include a hardware key located on a user terminal.

According to an embodiment, the input module may include at least one microphone capable of receiving a user's speech as a voice signal. The input module may include a speech input system, and may receive a user's speech as a voice signal through the speech input system. The at least one microphone may generate an input signal for audio input, thereby determining a digital input signal for the user's speech. According to an embodiment, a plurality of microphones may be implemented as an array. The array may be arranged in a geometric pattern, for example, a linear geometric form, a circular geometric form, or other configurations. For example, for a predetermined position, the array of four sensors may be separated by 90° and arranged in a circular pattern, in order to receive sound from four directions. In some implementations, the microphone may include spatially different arrays of sensors in data communication, including a networked array of sensors. The microphone may include omnidirectional, directional (e.g., shotgun microphone), and the like.

The client device 50 may include a pre-processing module 51 capable of pre-processing the user input (voice signals) received through the input module (e.g., microphone).

The pre-processing module 51 may remove an echo included in a user voice signal input through the microphone by including an adaptive echo canceller (AEC) function. The pre-processing module 51 may remove a background noise included in the user input by including a noise suppression (NS) function. The pre-processing module 51 may detect an end point of a user's voice and find a part in which the user's voice is present, by including an end-point detect (EPD) function. In addition, the pre-processing module 51 may adjust a volume of the user input to be suitable for recognizing and processing the user input by including an automatic gain control (AGC) function.

The client device 50 may include a voice activation module 52. The voice activation module 52 may recognize a wake up command that recognizes a user's call. The voice activation module 52 may detect a predetermined keyword (e.g., Hi LG) from the user input that has undergone a pre-processing process. The voice activation module 52 may exist in a standby state to perform an always-on keyword detection function.

The client device 50 may transmit a user voice input to a cloud server. Automatic speech recognition (ASR) and natural language understanding (NLU) operations, which are core components for processing a user voice, are generally executed in the cloud due to computing, storage, and power constraints. The cloud may include a cloud device 60 that processes the user input transmitted from a client. The cloud device 60 may exist in the form of a server.

The cloud device 60 may include an automatic speech recognition (ASR) module 61, an artificial intelligence (AI) agent 62, a natural language understanding (NLU) module 63, a text-to-speech (TTS) module 64, and a service manager 65.

The ASR module 61 may convert the user voice input received from the client device 50 into text data.

The ASR module 61 includes a front-end speech pre-processor. The front-end speech pre-processor extracts representative features from a speech input. For example, the front-end speech pre-processor performs Fourier transformation on the speech input to extract spectral features that characterize the speech input as a sequence of representative multidimensional vectors. The ASR module 61 may include one or more speech recognition models (e.g., acoustic models and/or language models) and implement one or more speech recognition engines. Examples of the speech recognition models include hidden Markov models, Gaussian-Mixture Models, deep neural network models, n-gram language models, and other statistical models. Examples of the speech recognition engines include a dynamic time distortion-based engine and a weighted finite state transducer (WFST)-based engine. The one or more speech recognition models and the one or more speech recognition engines may be used to process the extracted representative features of the front-end speech pre-processor to generate intermediate recognition results (e.g., phonemes, phoneme strings, and sub-words) and ultimately text recognition results (e.g., words, word strings, or a sequence of tokens).

If the ASR module 61 generates recognition results including text strings (e.g., words, or a sequence of words, or a sequence of tokens), the recognition results are sent to a natural language processing module for intention inference. In some examples, the ASR module 61 generates multiple candidate text representations of the speech input. Each candidate text representation is a sequence of words or tokens corresponding to the speech input.

The NLU module 63 may grasp a user intention by performing syntactic analysis or semantic analysis. The syntactic analysis may divide syntactic units (e.g., words, phrases, morphemes, etc.) and grasp what syntactic elements the divided units have. The semantic analysis may be performed using semantic matching, rule matching, or formula matching, etc. Hence, the NUL module 63 may acquire a domain, an intention, or a parameter necessary for expressing the intention by a user input.

The NLU module 63 may determine a user's intention and parameters using a mapping rule divided into the domain, the intention, and the parameter required to grasp the intention. For example, one domain (e.g., alarm) may include a plurality of intentions (e.g., alarm setting, alarm off), and one intention may include a plurality of parameters (e.g., time, number of repetitions, alarm sound, etc.). A plurality of rules may include, for example, one or more essential element parameters. The matching rule may be stored in a natural language understanding database.

The NLU module 63 grasps the meaning of words extracted from the user input by using linguistic features (e.g., syntactic elements) such as morphemes and phrases, and determines the user's intention by matching the meaning of the grasped word to a domain and an intention. For example, the NLU module 63 may determine the user intention by calculating how many words extracted from the user input are included in each domain and intention. According to an embodiment, the NLU module 63 may determine a parameter of the user input using words that are the basis for grasping the intention. According to an embodiment, the NLU module 63 may determine the user's intention using the natural language recognition database in which linguistic features for grasping the intention of the user input are stored. In addition, according to an embodiment, the NLU module 63 may determine the user's intention using a personal language model (PLM). For example, the NLU module 63 may determine the user's intention using personalized information (e.g., contact list, music list, schedule information, social network information, etc.). The personal language model may be stored, for example, in the natural language recognition database. According to an embodiment, the ASR module 61 as well as the NLU module 63 may recognize the user's voice by referring to the personal language model stored in the natural language recognition database.

The NLU module 63 may further include a natural language generation module (not shown). The natural language generation module may change designated information into the form of text. The information changed into the text form may be in the form of natural language speech. The designated information may include, for example, information about additional input, information guiding completion of an operation corresponding to the user input, or information guiding an additional input of the user, etc. The information changed into the text form may be transmitted to the client device and displayed on a display, or transmitted to a TTS module and changed to a voice form.

A speech synthesis module (TTS module) 64 may change text type information into voice type information. The TTS module 64 may receive the text type information from the natural language generation module of the NLU module 63 and change the text-type information into the voice type information to transmit it to the client device 50. The client device 50 may output the voice type information through the speaker.

The speech synthesis module 64 synthesizes a speech output based on a provided text. For example, the result generated by the automatic speech recognition (ASR) module 61 is in the form of a text string. The speech synthesis module 64 converts the text string into an audible speech output. The speech synthesis module 64 uses any suitable speech synthesis technique to generate speech output from texts, and this includes concatenative synthesis, unit selection synthesis, diphone synthesis, domain-specific synthesis, formant synthesis, articulatory synthesis, hidden Markov model (HMM)-based synthesis, and sinewave synthesis, but is not limited thereto.

In some examples, the speech synthesis module 64 is configured to synthesize individual words based on the phoneme string corresponding to the words. For example, the phoneme string is associated with a word in the generated text string. The phoneme string is stored in metadata associated with words. The speech synthesis module 64 is configured to directly process the phoneme string in the metadata to synthesize speech-type words.

Since the cloud environment generally has more processing power or resources than the client device, it is possible to acquire a speech output of higher quality than actual in client-side synthesis. However, the present disclosure is not limited to this, and it goes without saying that a speech synthesis process can be actually performed on the client side (see FIG. 9).

According to an embodiment of the present disclosure, the cloud environment may further include an AI agent 62. The AI agent 62 may be designed to perform at least some of the functions performed by the ASR module 61, the NLU module 63, and/or the TTS module 64 described above. In addition, the AI agent 62 may contribute to perform an independent function of each of the ASR module 61, the NLU module 63, and/or the TTS module 64.

The AI agent 62 may perform the above-described functions through deep learning. The deep learning represents data in a form (e.g., in case of an image, pixel information is expressed as a column vector) that the computer can understand when there is any data, and many studies (how to make better representation techniques and how to build a model to learn them) are being conducted to apply this to learning. As a result of these efforts, various deep learning techniques such as deep neural networks (DNN), convolutional deep neural networks (CNN), recurrent Boltzmann machine (RNN), restricted Boltzmann machine (RBM), deep belief networks (DBN), deep Q-network can be applied to fields such as computer vision, speech recognition, natural language processing, and voice/signal processing.

Currently, all major commercial speech recognition systems (MS Cortana, Skype translator, Google Now, Apple Siri, etc.) are based on deep learning techniques.

In particular, the AI agent 62 may perform various natural language processing including machine translation, emotion analysis, and information retrieval using deep artificial neural network structure in the field of natural language processing.

The cloud environment may include a service manager 65 capable of collecting various personalized information and supporting the function of the AI agent 62. The personalized information acquired through the service manager 65 may include at least one data (calendar application, messaging service, music application use, etc.) that the client device 50 uses through the cloud environment, at least one sensing data (camera, microphone, temperature, humidity, gyro sensor, C-V2X, pulse, ambient light, iris scan, etc.) that the client device 50 and/or the cloud device 60 collect, and off device data that is not directly related to the client device 50. For example, the personalized information may include maps, SMS, news, music, stock, weather, Wikipedia information.

The AI agent 62 is represented in a separate block to be distinguished from the ASR module 61, the NLU module 63, and the TTS module 64 for convenience of description, but the AI agent 62 may perform functions of at least a part or all of the modules 61, 62, and 64.

As above, FIG. 8 illustrates that the AI agent 62 is implemented in the cloud environment due to computing operation, storage, and power constraints, by way of example, but the present disclosure is not limited thereto.

For example, FIG. 9 is substantially the same as that illustrated in FIG. 8, except that the AI agent is included in the client device.

FIG. 9 illustrates an example block diagram of a voice processing device in a voice processing system according to another embodiment of the present disclosure. A client device 70 and a cloud environment 80 illustrated in FIG. 9 may correspond to the client device 50 and the cloud environment 60 mentioned in FIG. 8, except a difference in some configurations and functions. Hence, detailed functions of the corresponding block in FIG. 9 may refer to FIG. 8.

Referring to FIG. 9, the client device 70 may include a pre-processing module 51, a voice activation module 72, an ASR module 73, an AI agent 74, an NLU module 75, and a TTS module 76. In addition, the client device 70 may include an input module (at least one microphone) and at least one output module.

In addition, the cloud environment may include a cloud knowledge 80 that stores personalized information in the form of knowledge.

The function of each module illustrated in FIG. 9 may refer to FIG. 8. However, since the ASR module 73, the NLU module 75, and the TTS module 76 are included in the client device 70, communication with the cloud may not be required for speech processing such as speech recognition and speech synthesis. Hence, an instant and real-time speech processing operation is possible.

Each module illustrated in FIGS. 8 and 9 is merely an example for explaining a speech processing process, and may have more or fewer modules than the modules illustrated in FIGS. 8 and 9. It should also be noted that two or more modules may be combined or have different modules or different arrangements of modules. The various modules illustrated in FIGS. 8 and 9 may be implemented with software instructions, firmware, or a combination thereof for execution by one or more signal processing and/or on-demand integrated circuits, hardware, or one or more processors.

Figure 10:
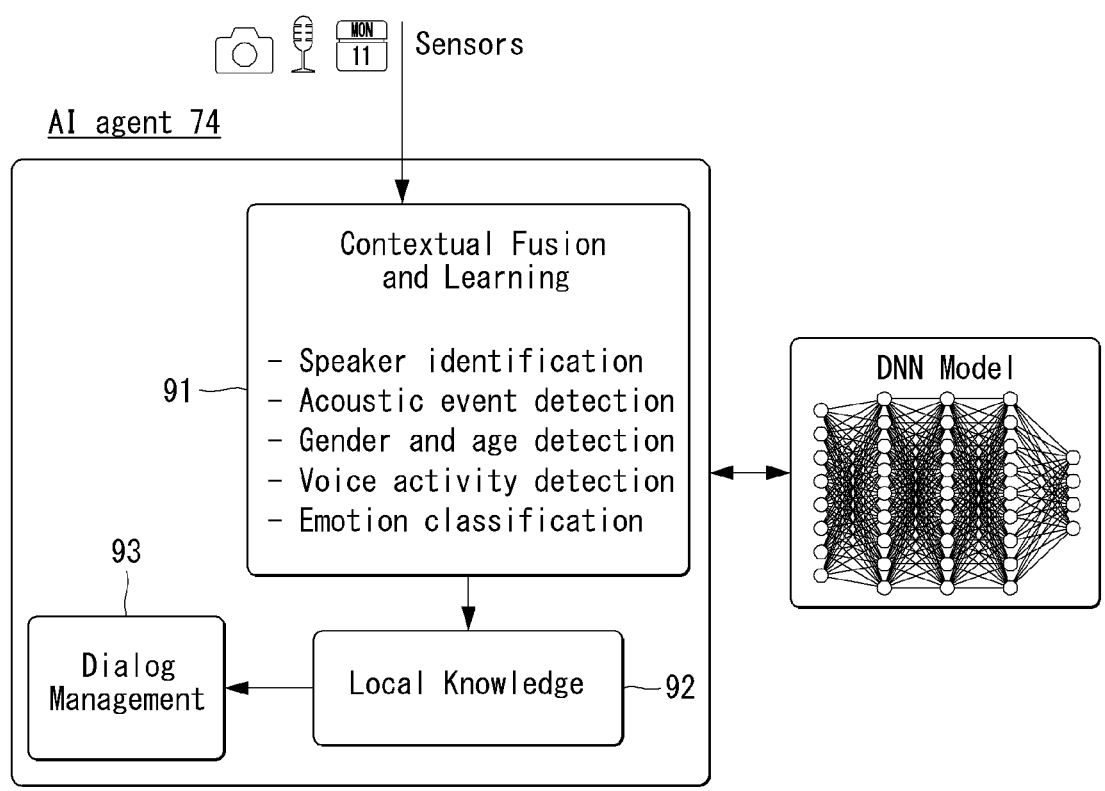
FIG. 10 is an example block diagram of an AI agent according to an embodiment of the present disclosure.

FIG. 10 illustrates an example block diagram of an AI agent according to an embodiment of the present disclosure.

Referring to FIG. 10, the AI agent 74 may support interactive operation with a user in addition to performing ASR operation, NLU operation, and TTS operation in the speech processing described through FIGS. 8 and 9. Alternatively, the AI agent 74 may contribute to the NLU module 63 that performs an operation of clarifying, supplementing, or additionally defining information included in text expressions received from the ASR module 61 using context information.

The context information may include client device user preference, hardware and/or software states of the client device, various sensor information collected before, during, or immediately after user input, previous interactions (e.g., conversations) between the AI agent and the user. It goes without saying that the context information in the present disclosure is dynamic and varies depending on time, location, content of the conversation, and other factors.

The AI agent 74 may further include a contextual fusion and learning module 91, a local knowledge 92, and a dialog management 93.

The contextual fusion and learning module 91 may learn a user's intention based on at least one data. The at least one data may include at least one sensing data acquired in a client device or a cloud environment. The at least one data may include speaker identification, acoustic event detection, speaker's personal information (gender and age detection), voice activity detection (VAD), and emotion classification.

The speaker identification may refer to specifying a person, who speaks, in a conversation group registered by voice. The speaker identification may include a process of identifying a previously registered speaker or registering a new speaker. The acoustic event detection may detect a type of sound and a location of the sound by detecting the sound itself beyond a speech recognition technology. The voice activity detection (VAD) is a speech processing technique of detecting the presence or absence of human speech (voice) in an audio signal which may include music, noise or other sounds. According to an example, the AI agent 74 may determine whether speech is present from the input audio signal. According to an example, the AI agent 74 may distinguish between speech data and non-speech data using a deep neural network (DNN) model. In addition, the AI agent 74 may perform an emotion classification operation on speech data using the DNN model. Speech data may be classified into anger, boredom, fear, happiness, and sadness according to the emotion classification operation.

The context fusion and learning module 91 may include the DNN model to perform the operation described above, and may determine an intention of a user input based on sensing information collected from the DNN model and a client device or collected in a cloud environment.

The at least one data is merely an example, and any data that may be referenced to determine the user's intention in a voice processing process may be included. The at least one data may be acquired through the DNN model described above.

The AI agent 74 may include the local knowledge 92. The local knowledge 92 may include user data. The user data may include a user's preference, a user address, a user's initial setting language, a user's contact list, and the like. According to an example, the AI agent 74 may additionally define a user intention by supplementing information included in the user's voice input using specific information of the user. For example, in response to a user's request "Invite my friends to my birthday party", the AI agent 74 may use the local knowledge 92 to determine who the "friends" are and when and where the "birthday party" will be given, without asking the user to provide more clear information.

The AI agent 74 may further include the dialog management 93. The dialog management 93 may be referred to as a dialog manager. The dialog manager 93 is a basic component of a voice recognition system and may manage essential information to generate an answer to a user intention analyzed by NLP. In addition, the dialog manager 93 may detect a barge-in event for receiving a user's voice input while a synthesized voice is output through a speaker in the TTS system.

The AI agent 74 may provide a dialog interface to enable voice conversation with a user. The dialog interface may refer to a process of outputting a response to a user's voice input through a display or a speaker. A final result output through the dialog interface may be based on the ASR operation, the NLU operation, and the TTS operation described above.

When a standard language and at least one dialect are mixed in one utterance used to train an acoustic model, or various dialects are mixed in one utterance, the acoustic model that has been trained using the utterance may be generated with low accuracy of training for dialects. Accordingly, in order to solve the above-described problem, the voice processing system can determine a representative region and improve the inference accuracy of the acoustic model through an utterance that imitates the dialects of other regions based on a result of determination. Hereinafter, the present disclosure describes a method of determining a representative region and generating an acoustic model based on a result of determination.

Figure 11:
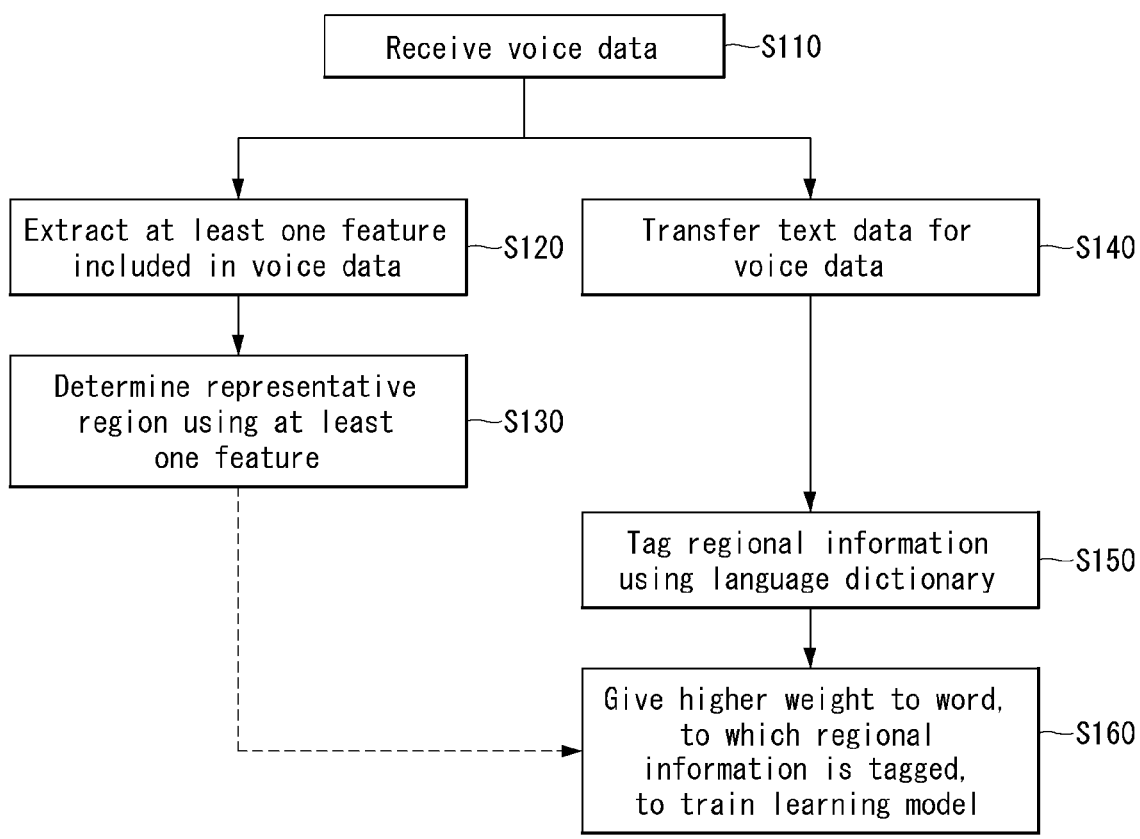
FIG. 11 is a flow chart illustrating a method for generating an acoustic model according to a first embodiment of the present disclosure.

FIG. 11 is a flow chart illustrating a method of generating an acoustic model according to a first embodiment of the present disclosure.

Referring to FIG. 11, the AI device 100 may receive voice data for training an acoustic model in S110. The AI device 100 may receive, from a network, voice data for training the acoustic model. For example, the AI device 100 may receive, through a transceiver, voice data using regionally different dialects, that are acquired via voice input/output interfaces of various electronic devices. The regionally different dialects may include not only different dialects based on Hangul, but also different dialects based on languages other than Hangeul.

The AI device 100 may extract at least one feature included in the voice data in S120. The feature refers to an utterance feature of a voice included in the voice data. The utterance feature may be represented as at least one of a linear frequency cepstral coefficient (LFCC), a Mel frequency cepstral coefficient (MFCC), or i-vector, but the present disclosure is not limited thereto.

The AI device 100 may determine a representative region using at least one feature in S130. The AI device 100 may apply the utterance feature extracted in the step S120 to a region classifier based on a pre-trained artificial neural network and generate an output for determining the representative region of the voice data. The AI device 100 may determine, as the representative region, a region corresponding to a highest value of output values corresponding to a plurality of regions based on an output of the region classifier.

For example, the output of the region classifier may indicate a probability that input data corresponds to a plurality of dialects. More specifically, the output may indicate, in response to an input 'Operate with wind of strong power', that the probability of standard language is 16% (0.16), the probability of Gyeongsang-do dialect is 56% (0.56), the probability of Jeolla-do dialect is 4% (0.04), the probability of Jeju Island dialect is 2% (0.02), the probability of Gangwon-do dialect is 3% (0.03), the probability of Chungcheong-do dialect is 7% (0.07), the probability of Gyeonggi-do dialect is 11% (0.11), and the probability of North Korean dialect is 1% (0.01). In this instance, the AI device 100 may determine the input as the Gyeongsang-do dialect corresponding to the highest probability.

The region classifier according to an embodiment of the present disclosure may be implemented as a classifier based on an artificial neural network, and the artificial neural network may be one of a dynamic recurrent neural network (DRNN) or a convolutional recurrent neural network (CRNN), but the present disclosure is not limited thereto.

The AI device 100 may generate text data for the received voice data in S140. The text data may be text data consisting of grapheme or phoneme. The AI device 100 may extract grapheme information or phoneme information from voice data included in Corpus, and transfer text data from the extracted grapheme or phoneme information. A pronunciation dictionary may be used together in the training of the acoustic model. The pronunciation dictionary may consist of morphemes and phonemes representing pronunciations thereof, and include information on pronunciation of dialect for each region.

The AI device 100 may tag regional information to a plurality of words included in the text data using a language dictionary in S150. In an example of a method of tagging regional information, the AI device 100 may tag regional information to each of a plurality of words using a language dictionary. More specifically, the AI device 100 may tokenize text data in units of sentence or paragraph on a per word basis, and tag regional information to each of the tokenized words. The language dictionary may include a standard language dictionary and a dialect language dictionary. For example, in a sentence 'Operate with wind of strong power', if regional information is tagged to the sentence using both the standard language dictionary and the dialect language dictionary, a result of tagging may be generated as follows: 'wind=standard language, strong=standard language, power=standard language, with=standard language, operate=Gyeongsang-do dialectal predicate'.

The AI device 100 may train the acoustic model using the text data, to which the regional information is tagged, and may change a parameter of the acoustic model based on the tagged regional information in S160. More specifically, the AI device 100 may train the acoustic model, that is robust to imitation dialects, by giving different weights to languages of the representative region and other regions. The AI device 100 may give words, to which regional information corresponding to the representative region is tagged, higher weights than words to which other regional information is tagged.

As described above, the method of generating the acoustic model according to an embodiment of the present disclosure can increase the accuracy of the acoustic model even if a plurality of regional languages (e.g., a plurality of dialects) is included in one sentence, by determining a representative region of voice data and giving relatively lower weights to words of regions other than the determined representative region.

Figure 12:
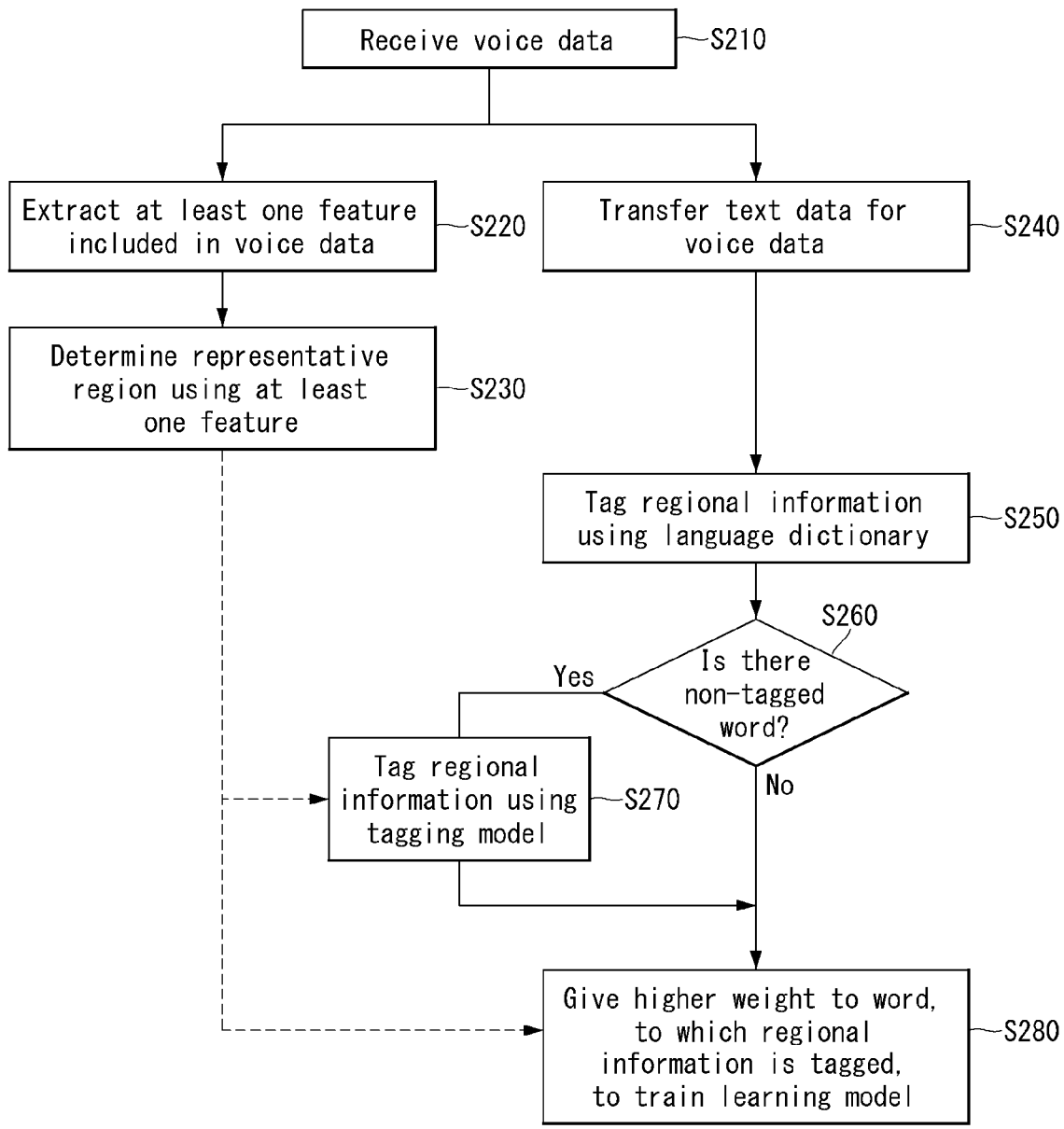
FIG. 12 is a flow chart illustrating a method for generating an acoustic model according to a second embodiment of the present disclosure.

FIG. 12 is a flow chart illustrating a method of generating an acoustic model according to a second embodiment of the present disclosure. In FIG. 12, a description overlapping with that of FIG. 11 will be omitted, and a description will focus on differences between them.

Referring to FIG. 12, the AI device 100 may receive voice data for training an acoustic model in S210.

The AI device 100 may extract at least one feature included in the voice data in S220.

The AI device 100 may determine a representative region of a speaker using at least one feature in S230.

The AI device 100 may generate text data for the received voice data in S240.

The AI device 100 may tag regional information to a plurality of words included in the text data using a language dictionary in S250.

The AI device 100 may analyze a result of tagging using the language dictionary and determine whether a word, to which the regional information is not tagged, exists in the plurality of words included in the text data in S260.

If there is non-tagged information (S260: YES), the AI device 100 may tag regional information to the plurality of words using a tagging model based on a pre-trained artificial neural network in response to this in S270. The AI device 100 can prevent a reduction in learning efficiency due to that the regional information is not tagged to any one of the plurality of words by performing the tagging of the regional information using the tagging model on a word that is identified that the regional information is not tagged among the plurality of words in the step S260.

More specifically, in the case of the tagging of the regional information using the tagging model, the AI device 100 may apply the tagging model to the representative region determined in the step S230 and the feature extracted from the text data to generate an output for tagging the regional information to the text data. The AI device 100 may tag the regional information to each of the plurality of words based on an output of the tagging model.

The tagging model according to an embodiment of the present disclosure is a learning model based on an artificial neural network, and may be implemented as a model based on one of a conditional random field (CRF), a recurrent neural network (RNN), or a long-short term memory (LSTM). The feature extracted from the text data may include at least one of context information, part of speech (POS) information, or morpheme information, but the present disclosure is not limited thereto.

In some embodiments, the method of generating the acoustic model may omit the tagging of the regional information using the language dictionary and may tag the regional information to the text data using only the tagging model.

The AI device 100 may train the acoustic model using the text data, to which the regional information is tagged, and may change a parameter of the acoustic model based on the tagged regional information in S280.

As described above, the AI device 100 can control the training of the acoustic model so that all the words are tagged as a result of tagging by performing the tagging of the regional information using both the tagging model and the language dictionary. However, the method of generating the acoustic model according to the second embodiment of the present disclosure can pre-check whether there is a non-tagged word and perform the tagging of regional information using the tagging model only when there is a non-tagged word, in order to reduce excessive AI processing.

Figure 13:
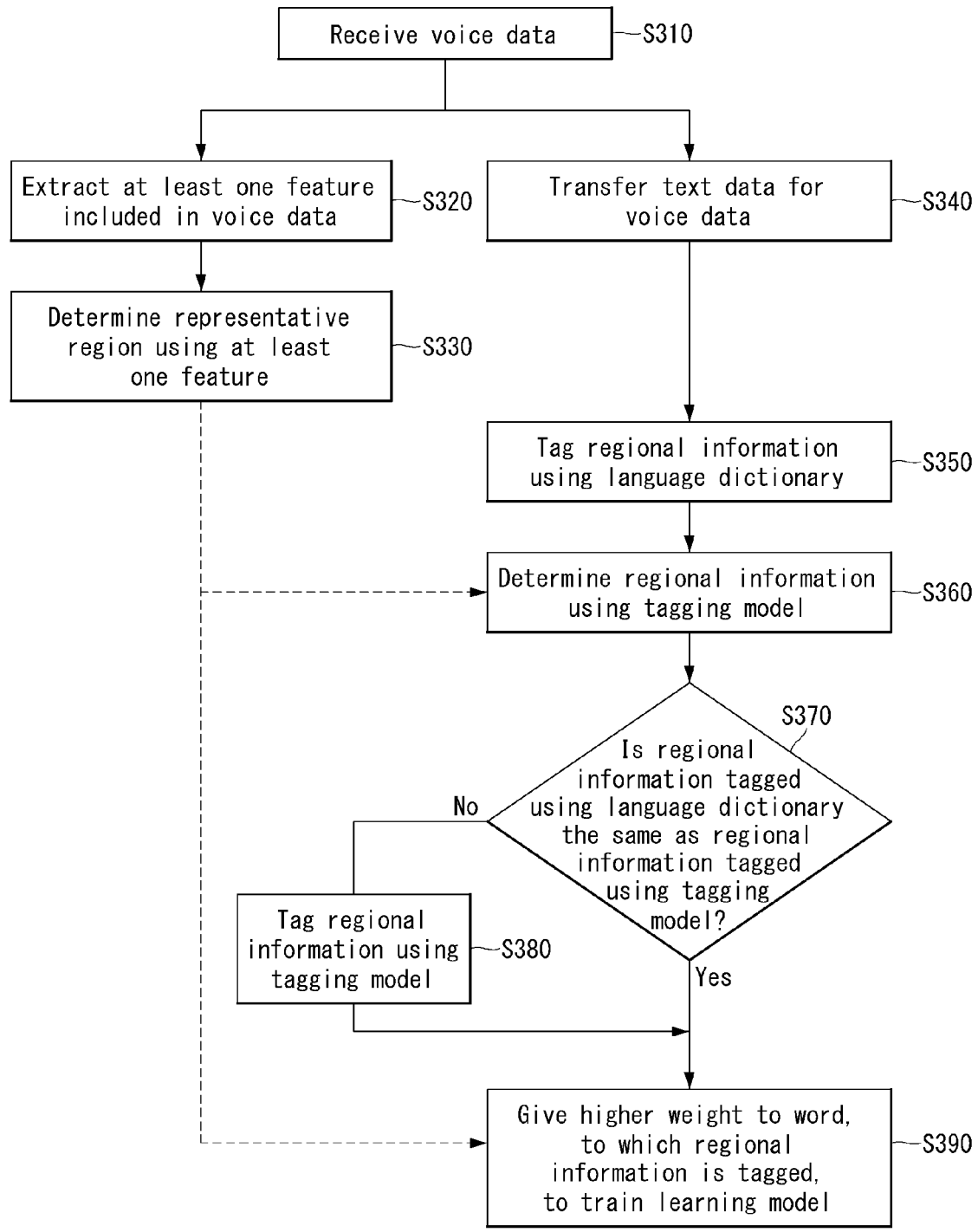
FIG. 13 is a flow chart illustrating a method for generating an acoustic model according to a third embodiment of the present disclosure.

FIG. 13 is a flow chart illustrating a method of generating an acoustic model according to a third embodiment of the present disclosure. In FIG. 13, a description overlapping with that of FIGS. 11 and 12 will be omitted, and a description will focus on differences between them.

Referring to FIG. 13, the AI device 100 may receive voice data for training an acoustic model in S310.

The AI device 100 may extract at least one feature included in the voice data in S320.

The AI device 100 may determine a representative region of a speaker using at least one feature in S330.

The AI device 100 may generate text data for the received voice data in S340.

The AI device 100 may tag regional information to a plurality of words included in the text data using a language dictionary in S350.

The AI device 100 may tag the regional information to the plurality of words using a tagging model based on a pre-trained artificial neural network in S360. The AI device 100 may perform the tagging of the regional information using the tagging model with respect to not only the words, to which the regional information is not tagged, but also the words that have been already tagged using the language dictionary.

The AI device 100 may compare a first tagging result using the language dictionary with a second tagging result using the tagging model in S370.

If the first tagging result and the second tagging result are different from each other through a comparison between them (S370:NO), the AI device 100 may update the tagging of the text data based on the second tagging result in response to this in S380.

The AI device 100 may train the acoustic model using the text data, to which the regional information is tagged, and may change a parameter of the acoustic model based on the tagged regional information in S390.

As described above, the AI device 100 can control the training of the acoustic model so that all the words are tagged as a result of tagging by performing the tagging of the regional information using both the tagging model and the language dictionary. There may occur an unexpected error in the tagging of the regional information based on the language dictionary due to time or location difference. The method of generating the acoustic model according to the third embodiment of the present disclosure can improve the accuracy of the tagging result by performing the tagging of additional regional information on not only the non-tagged words but also the words that have been already tagged, unlike the second embodiment, and can also improve the accuracy of subsequent inference result by updating the language dictionary.

The methods according to the first to third embodiments of the present disclosure can be mutually changed and used as first to third modes according to a provided environment or user setting, and the AI device 100 can train the acoustic models while changing sequentially or randomly the first to third modes in the process of generating all the acoustic models. For example, the AI device 100 can change the learning mode to one of the first to third modes according to a processing speed and/or a communication speed based on a resource state related to the AI processing or a communication state between the AI device 100 and the network.

FIGS. 11 to 13 illustrate that the training of the acoustic model is performed by the AI device 100, by way of example, but it may be performed by the AI system 1 of FIG. 7.

Figure 14:
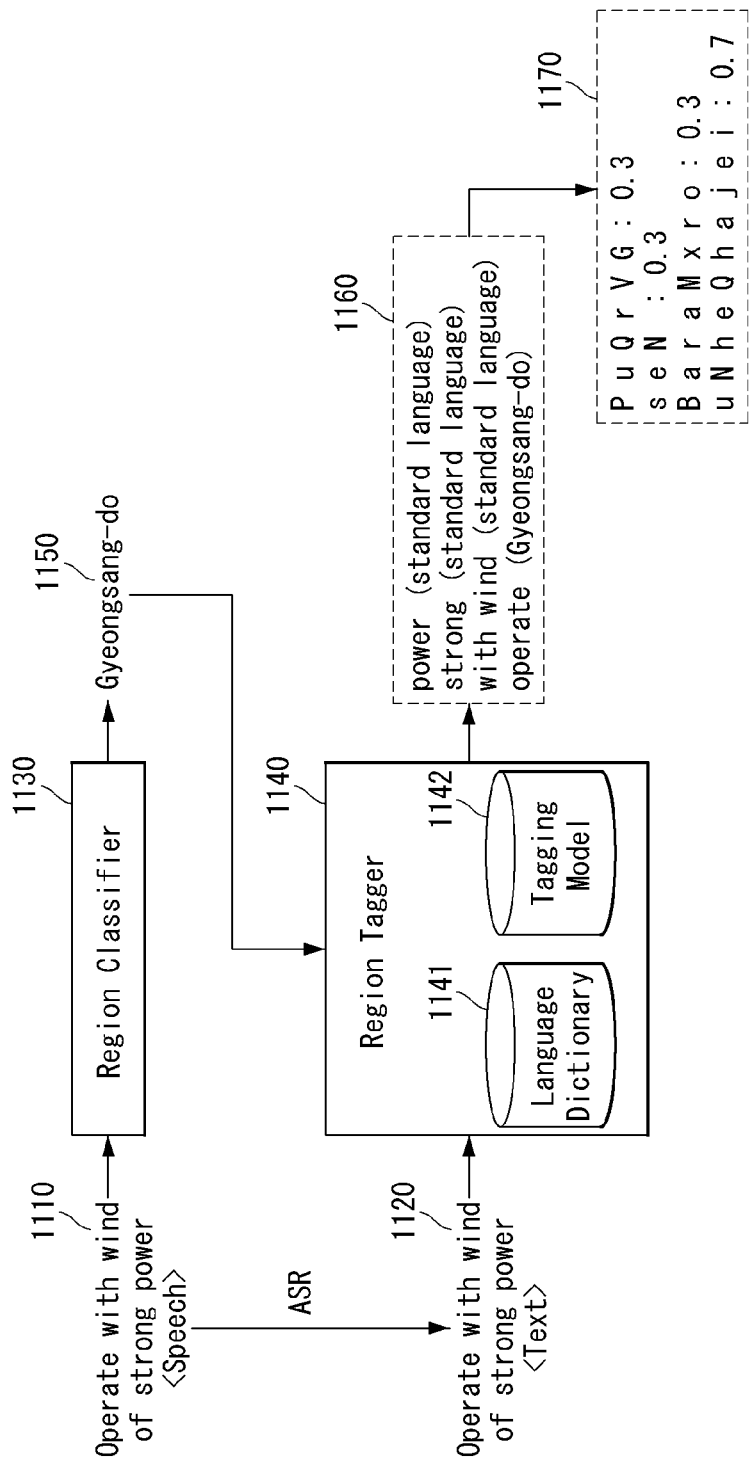
FIGS. 14 and 15 illustrate implementations of a method for generating an acoustic model according to various embodiments of the present disclosure.
Figure 15:
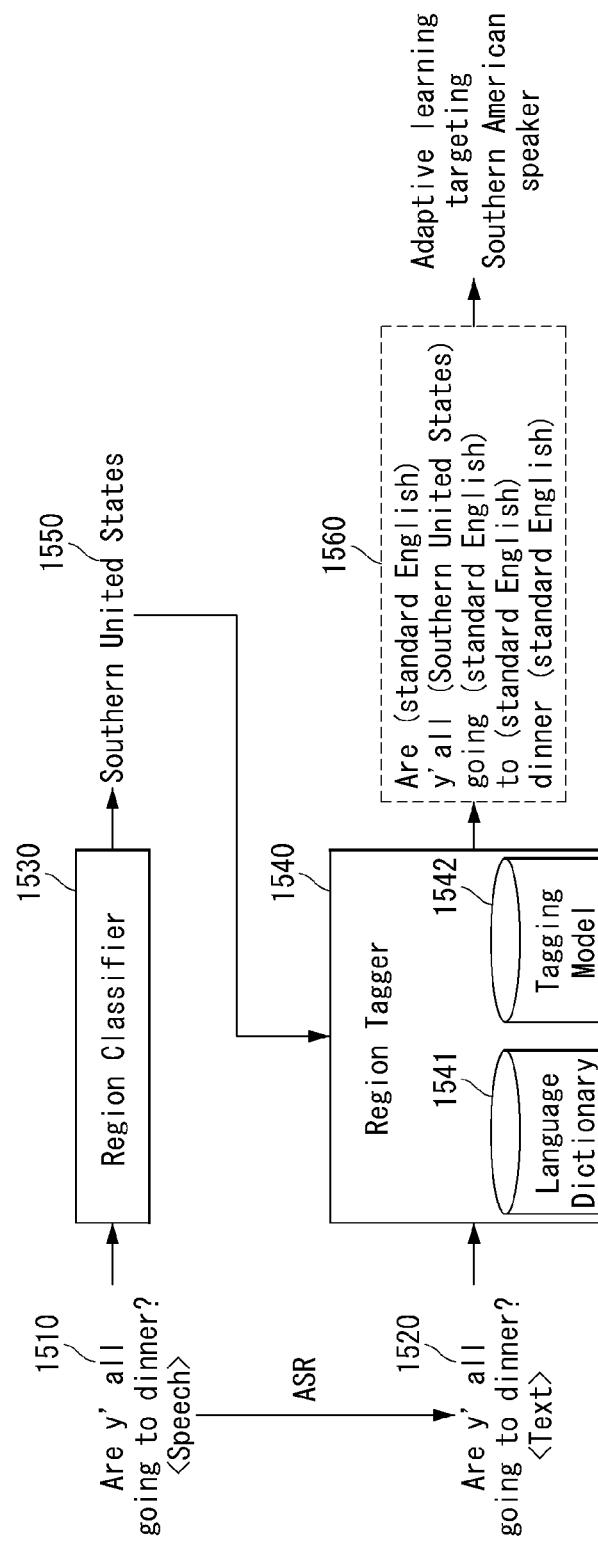

FIGS. 14 and 15 illustrate implementations of a method of generating an acoustic model according to various embodiments of the present disclosure.

Referring to FIG. 14, the AI device 100 may determine 'Gyeongsang-do' as a representative region 1150 in response to an input of voice data 1110 of 'Operate with wind of strong power'. More specifically, if the AI device 100 receives the voice data 1110 of 'Operate with wind of strong power', the AI device 100 may extract an utterance feature from input data. The utterance feature may be represented as at least one of a linear frequency cepstral coefficient (LFCC), a Mel frequency cepstral coefficient (MFCC), or i-vector. The AI device 100 may apply the extracted utterance feature to a pre-trained region classifier 1130 and determine the representative region 1150 of the voice data 1110 based on a generated output. The representative region 1150 thus determined may be used later in parameter update and/or regional information tagging.

The AI device 100 may transfer the received voice data 1110 to text data 1120 using the ASR module. The AI device 100 may tag regional information to the transferred text data 1120 using a region tagger 1140. The region tagger 1140 may include at least one of a language dictionary 1141 and a tagging model 1142. The implementation illustrated in FIG. 13 may give the regional information to the input text data 1120 using the method of generating the acoustic model illustrated in FIGS. 11 to 13. For example, the AI device 100 may derive 'wind=standard language, strong=standard language, power=standard language, with=standard language, operate=Gyeongsang-do dialectal predicate' as a result of giving the regional information in response to a text input 'Operate with wind of strong power'.

The AI device 100 may change text data 1160, to which the regional information is tagged as above, to phoneme-based text data 1170. In this instance, the AI device 100 may convert syllable-based text into phoneme-based text using a grapheme to phoneme (G2P) module. The G2P module is obvious to those skilled in the art related to natural language processing, and thus further description thereof will be omitted. If a text of 'Operate with wind of strong power' is input, the AI device 100 may generate phoneme-based text of 'P u Q r V G s e N B a r a M x r o u N h e Q h a j e l' through the G2P module. Each of phoneme-based words may be given a different weight based on regional information that has been tagged to syllable-based words. More specifically, the AI device 100 may check regional information tagged to each word. If the checked regional information is the same as regional information of the representative region 1150, the AI device 100 may give higher weights to words, of which regional information is the same as the regional information of the representative region 1150, than words of which regional information is different from the regional information of the representative region 1150.

For example, since 'Q u Q r V G' corresponding to 'power', 's e N' corresponding to 'strong', and 'B a r a M x r o' corresponding to 'with wind' are a standard language, a weight of 0.3 may be given to them. In addition, since 'u N h e Q h a j e l' corresponding to 'operate' is tagged with the same regional information as Gyeongsang-do determined as the representative region 1150, a weight of 0.7 may be given to it.

As above, the AI device 100 gives the phoneme-based text data 1170 a different weight for each regional information to update parameters (e.g., weights) of the acoustic model, and thus can prevent a reduction in learning efficiency due to imitated dialects of regions other than a region determined by the voice data 1110 for the purpose.

Referring to FIG. 15, a method of generating an acoustic model according to various embodiments of the present disclosure may be applied equally to languages of various countries as well as Hangul. For example, the AI device 100 may determine 'Southern United States' as a representative region 1550 in response to voice data 1510 of 'Are y'all going to dinner'. More specifically, if the AI device 100 receives the voice data 1510 of 'Are y'all going to dinner', the AI device 100 may extract an utterance feature from input data. The utterance feature may be represented as at least one of a linear frequency cepstral coefficient (LFCC), a Mel frequency cepstral coefficient (MFCC), or i-vector. The AI device 100 may apply the extracted utterance feature to a pre-trained region classifier 1530 and determine a representative region 1550 of the voice data 1510 based on a generated output. The representative region 1550 thus determined may be used later in parameter update and/or regional information tagging.

The AI device 100 may transfer the received voice data 1510 to text data 1520 using the ASR module. The AI device 100 may tag regional information to the transferred text data 1120 using a region tagger 1540. The region tagger 1540 may include at least one of a language dictionary 1541 and a tagging model 1542. The implementation illustrated in FIG. 15 may give the regional information to the input text data 1520 using the method of generating the acoustic model illustrated in FIGS. 11 to 13. For example, the AI device 100 may derive 'Are=standard English, y'all=Southern United States, going=standard English, to =standard English, dinner=standard English' as a result of giving the regional information in response to a text input 'Are y'all going to dinner'.

The AI device 100 may change text data 1560, to which the regional information is tagged as above, to phoneme-based text data. In this instance, the AI device 100 may convert syllable-based text into phoneme-based text using a G2P module. Each of phoneme-based words may be given a different weight based on regional information that has been tagged to syllable-based words. More specifically, the AI device 100 may check regional information tagged to each word. If the checked regional information is the same as regional information of the representative region 1550, the AI device 100 may give higher weights to words, of which regional information is the same as the regional information of the representative region 1550, than words of which regional information is different from the regional information of the representative region 1550.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A method for generating an acoustic model, the method comprising:
    receiving voice data for training the acoustic model;
    generating text data corresponding to the voice data;
    determining a representative region of the received voice data;
    tagging regional information to a plurality of words included in the generated text data; and
    training the acoustic model using the text data, to which the regional information is tagged, and changing a parameter of the acoustic model based on the representative region determined from the voice data and the tagged regional information, wherein tagging the regional information comprises tagging the regional information to the plurality of words using a language dictionary, and
    based on a word, to which the regional information is not tagged, existing in the plurality of words as a result of tagging the regional information to the plurality of words using the language dictionary, tagging the regional information to the plurality of words using a tagging model based on a pre-trained artificial neural network.

2. The method of claim 1, wherein receiving the voice data comprises receiving the voice data using regionally different dialects that are acquired via voice input/output interfaces of various electronic devices.

3. The method of claim 1, wherein tagging the regional information comprises:
    applying a parameter indicating the representative region and a feature extracted from the text data to the tagging model based on the pre-trained artificial neural network to generate an output for tagging the regional information to the text data; and
    tagging the regional information to the plurality of words based on the output.

4. The method of claim 3, wherein the tagging model is a model based on one of a conditional random field (CRF), a recurrent neural network (RNN), or a long-short term memory (LSTM).

5. The method of claim 3, wherein the feature extracted from the text data includes at least one of context information, part of speech (POS) information, or morpheme information.

6. The method of claim 1, wherein changing the parameter of the acoustic model comprises giving a higher weight to a word, to which the regional information corresponding to the representative region is tagged, than a word to which other regional information is tagged.

7. The method of claim 1, wherein determining the representative region comprises:
    extracting an utterance feature from the voice data;
    applying the extracted utterance feature to a region classifier based on a second pre-trained artificial neural network to generate an output for determining the representative region of the voice data; and
    determining, as the representative region, a region corresponding to a highest value of output values corresponding to a plurality of regions based on the output.

8. The method of claim 7, wherein the utterance feature is a feature vector of at least one of a linear frequency cepstral coefficient (LFCC), a Mel frequency cepstral coefficient (MFCC), or i-vector.

9. The method of claim 7, wherein the second artificial neural network is one of a dynamic recurrent neural network (DRNN) or a convolutional recurrent neural network (CRNN).

10. The method of claim 1, further comprising:
comparing a first tagging result using the language dictionary with a second tagging result using the tagging model; and
based on the first tagging result and the second tagging result being different from each other, updating the tagging of the text data based on the second tagging result.

11. A computing device comprising:
an antenna configured to receive voice data for training an acoustic model; and
a processor configured to generate text data corresponding to the voice data, determine a representative region of the received voice data, tag regional information to a plurality of words included in the generated text data, train the acoustic model using the text data to which the regional information is tagged, and change a parameter of the acoustic model based on the representative region determined from the voice data and the tagged regional information,
wherein tagging the regional information comprises tagging the regional information to the plurality of words using a language dictionary, and
based on a word, to which the regional information is not tagged, existing in the plurality of words as a result of tagging the regional information to the plurality of words using the language dictionary, tagging the regional information to the plurality of words using a tagging model based on a pre-trained artificial neural network.

12. A non-transitory computer readable recording medium storing software which when executed by a computer causes the computer to execute a method comprising:
receiving voice data for training the acoustic model;
generating text data corresponding to the voice data;
determining a representative region of the received voice data;
tagging regional information to a plurality of words included in the generated text data; and
training the acoustic model using the text data, to which the regional information is tagged, and changing a parameter of the acoustic model based on the representative region determined from the voice data and the tagged regional information, wherein tagging the regional information comprises tagging the regional information to the plurality of words using a language dictionary, and
based on a word, to which the regional information is not tagged, existing in the plurality of words as a result of tagging the regional information to the plurality of words using the language dictionary, tagging the regional information to the plurality of words using a tagging model based on a pre-trained artificial neural network.

* * * * *